United States Patent
Reis

(10) Patent No.: US 9,040,797 B1
(45) Date of Patent: May 26, 2015

(54) MULTI-FUNCTION UKULELE CHORD WHEEL

(71) Applicant: Wayne Reis, St. George, UT (US)

(72) Inventor: Wayne Reis, St. George, UT (US)

( * ) Notice: Subject to any disclaimer, the term of this patent is extended or adjusted under 35 U.S.C. 154(b) by 0 days.

(21) Appl. No.: 14/157,497

(22) Filed: Jan. 16, 2014

(51) Int. Cl.
*G09B 15/02* (2006.01)
*G09B 15/00* (2006.01)

(52) U.S. Cl.
CPC .................... *G09B 15/008* (2013.01)

(58) Field of Classification Search
USPC ............... 84/470 R, 474, 484, 485 R
See application file for complete search history.

(56) References Cited

U.S. PATENT DOCUMENTS 6,452,080 B1 *  9/2002  Coonce ..................... 84/477 R
7,910,818 B2 *  3/2011  Kim et al. ................. 84/477 R

* cited by examiner

*Primary Examiner* — Kimberly Lockett
(74) *Attorney, Agent, or Firm* — Steven Rinehart

(57) ABSTRACT

A portable, multi-function Ukulele learning device is disclosed having three disks. In one embodiment, a larger inner disk is axially affixed at its center to a smaller disk on its obverse face and on its converse face. Both smaller disks define slots for exposing key, note, vamp or chords on the inner disk. The disclosed apparatus provides an efficient, unique means of teaching Ukulele users, or the users of other instrument, to play music.

9 Claims, 4 Drawing Sheets

MULTI-FUNCTION UKULELE CHORD WHEEL

CROSS-REFERENCE TO RELATED APPLICATION

This application claims priority to, and incorporates, U.S. provisional application 61/753,427 for Wayne Reis filed on Jan. 16, 2014.

BACKGROUND OF THE INVENTION

1. Field of the Invention

This invention relates to devices for learning music, and more particularly relates to printed wheels axially interconnected for learning chords on the Ukulele.

2. Description of the Related Art

Learning to play the Ukulele can be discouraging for students and amateurs unfamiliar with its complex chords and vamps. Many students become discouraged because of their inability to play transpose keys, learn chords or play vamps and the lack of available literature and instructional materials on the use of Ukuleles. It would be highly beneficial to provide students and other Ukulele players with a tool for learning to play which is small and efficient, and easily carried with the instrument.

SUMMARY OF THE INVENTION

From the foregoing discussion, it should be apparent that a need exists for a Ukulele chord wheel. Beneficially, such an exercise ball would overcome many of the difficulties with prior art by providing a more functional apparatus to players of the Ukulele.

The present invention has been developed in response to the present state of the art, and in particular, in response to the problems and needs in the art that have not yet been fully solved by currently available apparatii and methods. Accordingly, the present invention has been developed to provide a multi-function Ukulele chord wheel, the chord wheel comprising: an inner disk having an obverse face and a converse face, the obverse face of the inner disk printed with three concentric rings, an outer ring, a middle ring, and an inner ring; wherein the outer ring comprises a plurality of printed chromatic keys; wherein the middle ring comprises a plurality of first printed vamp chords, each first printed vamp chord associated with a printed chromatic key disposed directly above in the outer ring; wherein the inner ring comprises a plurality of second printed vamp chords, each second printed vamp chord associated with a first printed vamp chord disposed above in the middle ring; an obverse disk defining a U-shaped slot on its perimeter, the obverse disk axially affixed to a center of the inner disk; wherein the U-shaped slot exposes contents of a segment when the U-shaped slot is axially rotated to align with said segment; a converse disk defining an L-shaped slot, the converse disk axially affixed to a center of the inner disk; and wherein the L-shaped slot exposes one or more printed chords, the printed chords associated with one or more printed keys circumscribing a perimeter of the inner disk.

In various embodiments, the diameter of the apparatus may be between one inch and 100 inches. In some embodiments, the inner disk, obverse disk and converse disk are fabricated from one of cardboard, paper, wood, elastomeric materials, and metal.

The printed matter on the apparatus may be one of engraved and embossed. The inner disk may comprise twelve segments. The obverse face may comprise five chord diagrams. The obverse face may comprise three shaded chord diagram groups.

A second multi-function Ukulele chord wheel is recited, the chord wheel comprising: an inner disk having an obverse face and a converse face, the obverse face of the inner disk printed with three concentric rings, an outer ring, a middle ring, and an inner ring; wherein the outer ring comprises a plurality of printed chromatic keys; wherein the middle ring comprises a plurality of first printed vamp chords, each first printed vamp chord associated with a printed chromatic key disposed directly above in the outer ring; wherein the inner ring comprises a plurality of second printed vamp chords, each second printed vamp chord associated with a first printed vamp chord disposed above in the middle ring; an obverse disk defining a slot on its perimeter, the obverse disk axially affixed to a center of the inner disk; wherein the slot exposes contents of a segment when the U-shaped slot is axially rotated to align with said segment; a converse disk defining a slot, the converse disk axially affixed to a center of the inner disk; and wherein the slot exposes one or more printed chords, the printed chords associated with one or more printed keys circumscribing a perimeter of the inner disk.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
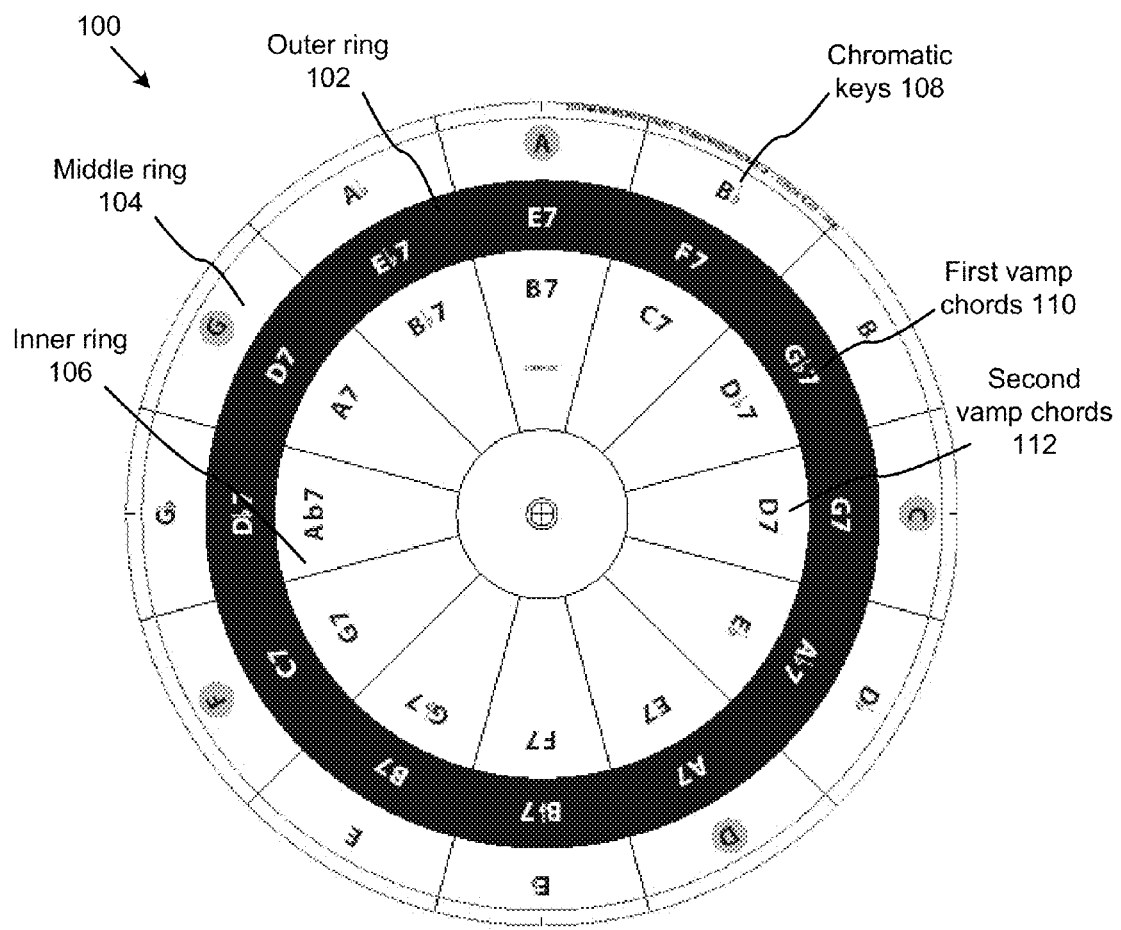
FIG. 1 is an obverse view of an inner Ukulele wheel in accordance with the present invention.

FIG. 1 is an obverse view of an inner Ukulele disk 100 in accordance with the present invention. The inner Ukulele disk 100 comprises an outer ring 102, a middle ring 104, an inner ring 106, twelve chromatic keys 108, twelve first chord vamps 110, and twelve second chord vamps 112.

The disk 100 in the shown embodiment is 6.5 inches wide, but may vary from 1 inch wide to more than 100 inches wide. The disk 100 may be manufactured from cardboard, paper, wood, polymeric materials, metals, alloys and the like. The disk 100 is printed or engraved with chromatic keys 108 circumscribing the perimeter of the disk 100 within an outer ring 102. The outer ring 102 in the shown embodiment comprises a white background. The outer ring 102 in other embodiments may comprise a shaded, patterned, textured or colored background.

The disk 100 is divided, in the shown embodiment, into twelve equally-sized, radially-extending segments. The disk is divided into an outer ring 102, a middle ring 104, and an inner ring 106. The disk 100 comprises an obverse face and a converse face. The segments may be shaded or color-coordinated in accordance with musical associations they share.

Twelve first chord vamps circumscribe the perimeter 110 of the middle ring 104. The middle ring 104 is shown with a black background. The middle ring 104 in other embodiments may comprise a shaded, patterned, textured or colored background.

Twelve second chord vamps circumscribe the perimeter 112 of the inner ring 106. The inner ring 106 is shown with a white background. The inner ring 106 in other embodiments may comprise a shaded, patterned, textured or colored background.

When the apparatus comprising the disk 100 is used, the keys, notes, chords or vamps shown in the inner ring 106 (closest to the center of the disk 100) is meant to be played first by a user, followed by the keys, notes, chords, or vamps shown in the middle ring 104.

In various embodiments, the disk 100 may be divided into more or less than twelve segments, and may comprise more of less than twelve chromatic keys 108.

The obverse side of the disk 100 is shown. A smaller inner disk is affixed to the disk 100 for featuring segments on the disk 100.

Figure 2:
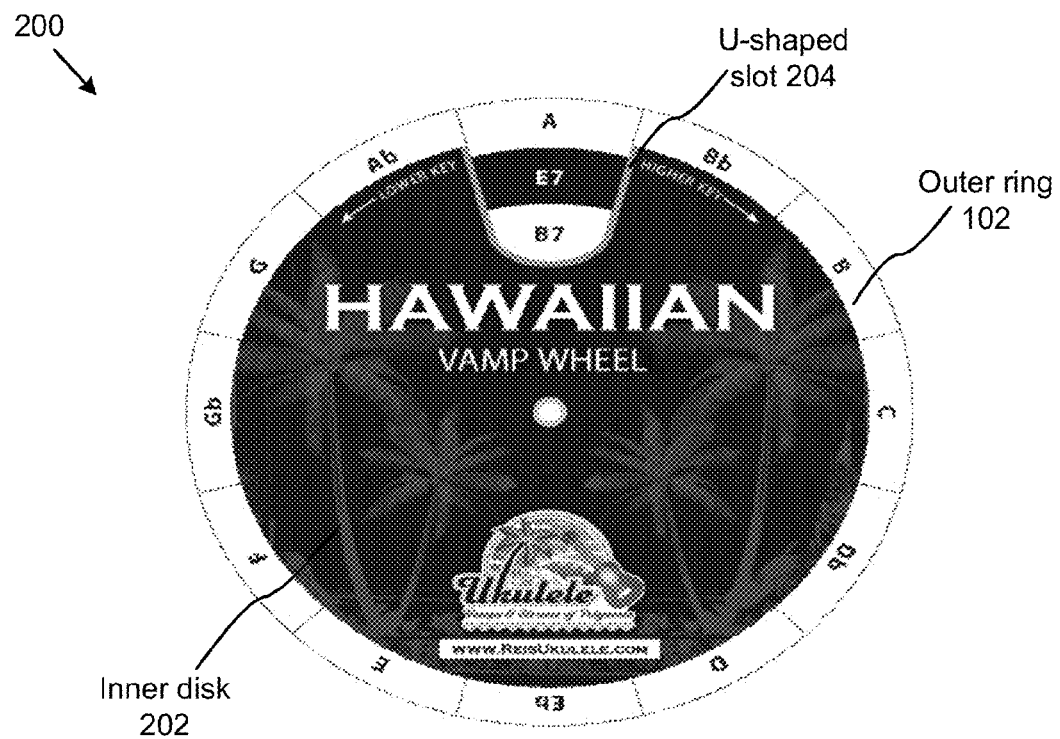
FIG. 2 is an obverse view of a Ukulele wheel in accordance with the present invention.

FIG. 2 is an obverse view of a Ukulele wheel 200 in accordance with the present invention. The wheel 200 comprises an outer ring 102, an inner disk 202 defining a U-shaped slot 204.

The wheel 200 is a multifunctional product that display every Hawaiian vamp, transposes every vamp key, transposes chords or any song on the Ukulele, displays the top 40 chords and chord diagrams and displays the top five vamp chord diagrams all in one portable apparatus.

The wheel 200 comprises an inner disk 202 which defines a U-shaped slot 204 on its outer perimeter. The disk 202, in the shown embodiment, may be affixed to the disk 100 with a metal or polymeric eyelet at the center of the wheel 200, but may be affixed to the disk 100 using other means known to those of skill in the art.

The inner disk 202 is rotated axially around the disk 100 with a user's thumb or fingers. The U-shaped slot 204 exposes the chords, notes, keys, and/or vamps printed or engraved on a segment of the obverse face of the disk 100, each being associated one with another when playing the Ukulele or another instrument, strung or unstrung.

The disks 100, 202, and 402 may be rotated, or interchanged. Disks 202 and 402 may be interchanged.

Figure 3:
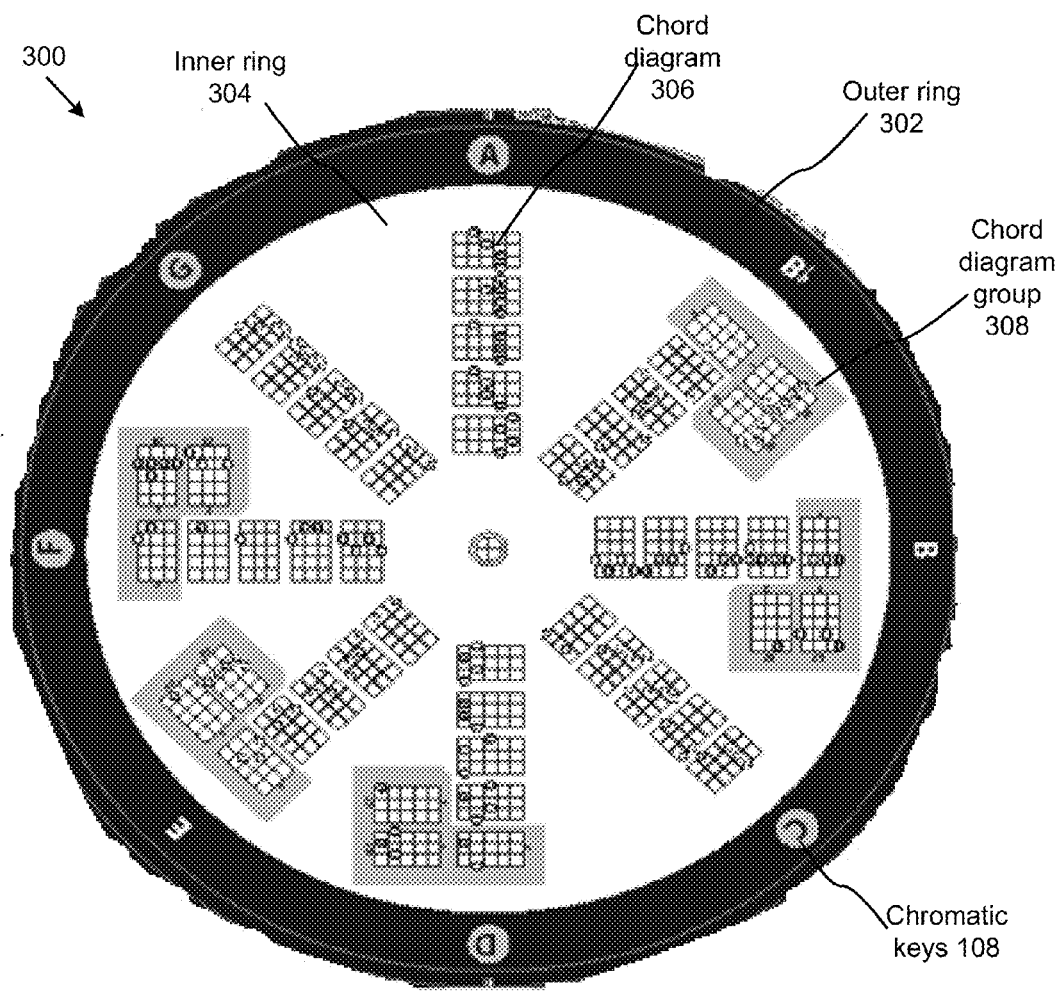
FIG. 3 is a converse view of an inner Ukulele wheel in accordance with the present invention.

FIG. 3 is a converse view of an inner Ukulele disk 300 in accordance with the present invention. The disk 300 comprises an outer ring 302 having chromatic keys 108, an inner ring 304, chord diagrams 306, and chord diagram groups 308.

The disk 300 shows the converse face of the disk 100. This converse face comprises a printed or engraved outer ring 302 mirroring the outer ring 102 and its keys and/or chromatic chords 108. The disk 300 comprises an inner ring 304 having a plurality of chord diagrams 306. These chord diagrams 306 comprise five chord diagram groups 308, which are shaded. The chord diagram groups 308 are arranged in L-shaped fashion as shown, but be otherwise arranged in other embodiments. The chord diagram groups 308 may be color-coordinated, embossed, or otherwise distinguished from the remaining chord diagrams 306. The unshaded chord diagram groups 306 comprise five unshaded chord diagrams. The chord diagrams 306 and chord diagram groups 308 may comprise more or less than the number of show grouping, diagrams, chords, and the like.

Figure 4:
FIG. 4 is a converse view of a Ukulele wheel in accordance with the present invention.

FIG. 4 is a converse view of a Ukulele wheel 400 in accordance with the present invention. The wheel 400 comprises chromatic keys 108, and an inner converse disk 402 defining an L-shaped slot 404.

The inner converse disk 402 is affixed at its center to the disk 100 on the obverse face of the disk 100. The inner converse disk 402 defines an L-shaped slot 404 for exposes one or more of the chord diagrams 306 and/or chord diagram groups 308.

A user of the wheel 400 rotates the L-shaped slot 404 axially around the disk 402 until the L-shaped slot 404 aligns underneath a desired/selected chromatic key 108. The slot 404 then exposes the chords 306, 308 associated on the Ukulele with the selected chromatic key 108.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A multi-function Ukulele chord wheel, the chord wheel comprising:
    an inner disk having an obverse face and a converse face, the obverse face of the inner disk printed with three concentric rings, an outer ring, a middle ring, and an inner ring;
    wherein the outer ring comprises a plurality of printed chromatic keys;
    wherein the middle ring comprises a plurality of first printed vamp chords, each first printed vamp chord associated with a printed chromatic key disposed directly above in the outer ring;
    wherein the inner ring comprises a plurality of second printed vamp chords, each second printed vamp chord associated with a first printed vamp chord disposed above in the middle ring;
    an obverse disk defining a U-shaped slot on its perimeter, the obverse disk axially affixed to a center of the inner disk;
    wherein the U-shaped slot exposes contents of a segment when the U-shaped slot is axially rotated to align with said segment;
    a converse disk defining an L-shaped slot, the converse disk axially affixed to a center of the inner disk; and wherein the L-shaped slot exposes one or more printed chords, the printed chords associated with one or more printed keys circumscribing a perimeter of the inner disk.

2. The multi-function Ukulele chord wheel of claim 1, wherein the diameter of the apparatus is between one inch and 100 inches.

3. The multi-function Ukulele chord wheel of claim 1, wherein the inner disk, obverse disk and converse disk are fabricated from one of cardboard, paper, wood, elastomeric materials, and metal.

4. The multi-function Ukulele chord wheel of claim 1, wherein printed matter on the apparatus is one of engraved and embossed.

5. The multi-function Ukulele chord wheel of claim 1, the inner disk comprise twelve segments.

6. The multi-function Ukulele chord wheel of claim 1, wherein the obverse face comprises five chord diagrams.

7. The multi-function Ukulele chord wheel of claim 1, wherein the obverse face comprises three shaded chord diagram groups.

8. The multi-function Ukulele chord wheel of claim 1, wherein vamp chords printed the inner ring are meant to be played by a user before vamp chords printed in the middle ring.

9. A multi-function Ukulele chord wheel, the chord wheel comprising:
- an inner disk having an obverse face and a converse face, the obverse face of the inner disk printed with three concentric rings, an outer ring, a middle ring, and an inner ring;
- wherein the outer ring comprises a plurality of printed chromatic keys;
- wherein the middle ring comprises a plurality of first printed vamp chords, each first printed vamp chord associated with a printed chromatic key disposed directly above in the outer ring;
- wherein the inner ring comprises a plurality of second printed vamp chords, each second printed vamp chord associated with a first printed vamp chord disposed above in the middle ring;
- a converse disk defining a slot, the converse disk axially affixed to a center of the inner disk; and
- wherein the slot exposes one or more printed chords, the printed chords associated with one or more printed keys circumscribing a perimeter of the inner disk.

* * * * *